Lewis Miller,
Harvester-Rakes.
No 74,929. Patented Feb. 25, 1868.
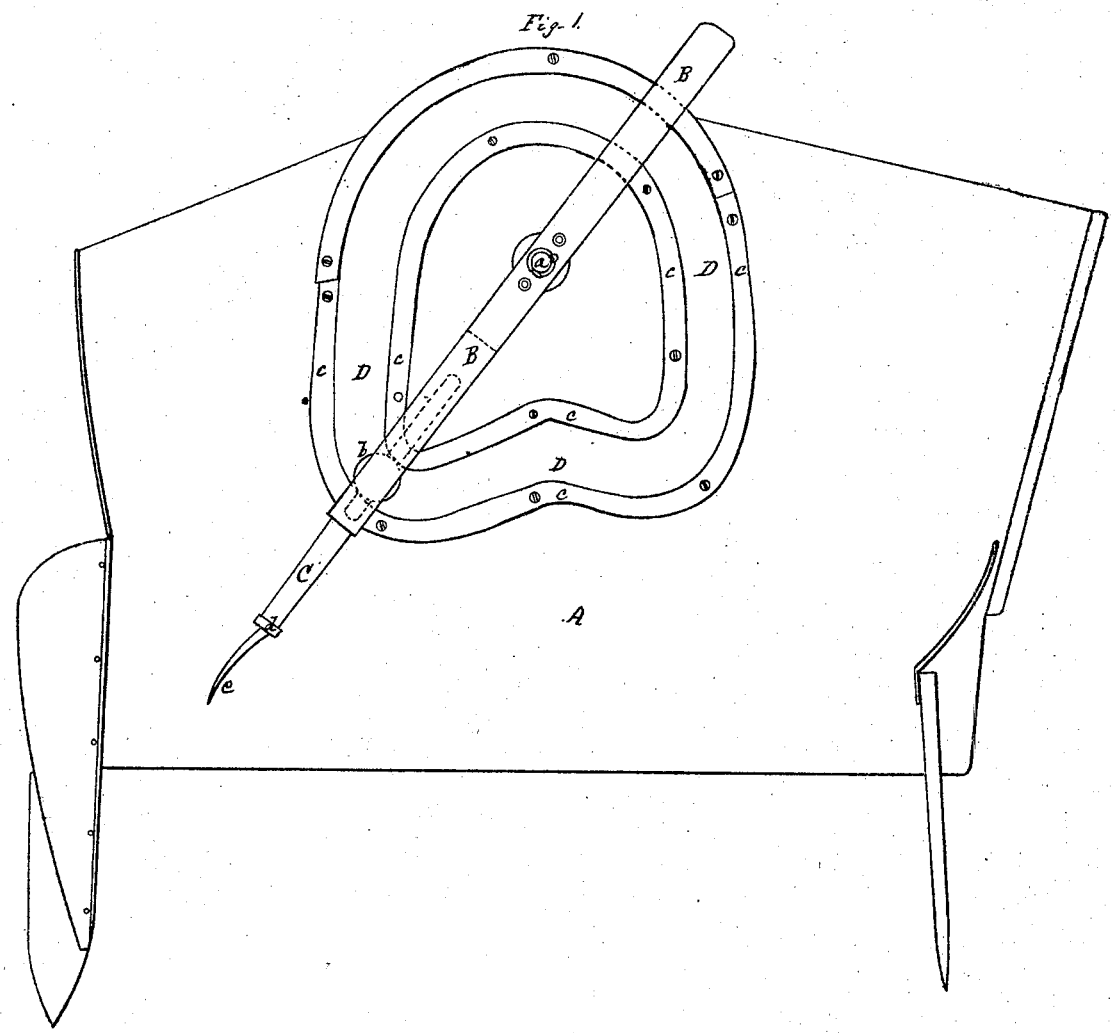
Witnesses
Jn? D. Patter
T. J. Chamberlain
Inventor.
Lewis Miller,
By atty. A B Stoughton

United States Patent Office.

LEWIS MILLER, OF AKRON, OHIO.

Letters Patent No. 74,929, dated February 25, 1868.

IMPROVEMENT IN HARVESTER-RAKES.

*The Schedule referred to in these Letters Patent and making part of the same.*

TO ALL WHOM IT MAY CONCERN:

Be it known that I, LEWIS MILLER, of Akron, in the county of Summit, and State of Ohio, have invented certain new and useful Improvements in Operating Rakes on Harvesting-Machines; and I do hereby declare the following to be a full, clear, and exact description of the same, reference being had to the accompanying drawing, making a part of this specification, in which—

Figure 1 represents the platform or grain-table of a harvesting-machine, with the rake or fork thereon, and the appliances for giving it a revolving and also a parallel, or nearly so, motion along the front of the platform.

My invention consists in the combined use of two revolving telescopic arms, one of which, and that one which carries the rake or fork, being projected or withdrawn during the rotation, by means of a cam-path, and roller or guide moving in it, for the purpose of causing the rake or fork to properly enter the grain, and move it, with a parallel motion, along the front of the platform, and then turn, and deliver it on to the ground, as will be explained.

A is a platform or grain-table, furnished with the usual dividers and guiding-boards. Upon this platform, at $a$, is placed a post or journal, upon which an arm, B, is placed, and around which it is moved by any suitable gearing or mechanism, driven from the main driving-wheels of the machine. Within, upon, or underneath this arm B, there is a sliding arm, C, which is moved out or in upon said arm B, by means of a roller, $b$, attached to said sliding arm, and running in a cam-path or way, D, formed by marginal ledges, $c$. Upon the end of the sliding arm C there is secured an upright, $d$, into which the tines $e$ are secured. The object and purpose of the sliding arm C are to cause the rake or fork to enter the grain at the extreme outside corner, and then move along parallel with the front of the platform, to near its inside end, and there turn, and following the guiding or gavelling-board, move the grain to the point where it is delivered on to the ground, and then continue on around for another succeeding similar operation.

What I claim as my invention, and desire to secure by Letters Patent, is—

The combination of two revolving telescopic arms, turning upon a centre arranged on the platform at $a$, one of which carries a fork or rake, and is caused to slide on the other by means of a roller or guide traversing a cam-path or way, D, formed by two raised marginal ledges, $c\ c$, also on the platform, and surrounding the centre, $a$, substantially as and for the purpose described.

LEWIS MILLER.

Witnesses:
GEO. A. COLLINS,
JOHN McGREGOR.